United States Patent
Soderberg (10) Patent No.: US 8,080,131 B2
(45) Date of Patent: Dec. 20, 2011

(54) DEVICE AND METHOD FOR MEASURING THE VELOCITY OF A MOVING PAPER WEB

(75) Inventor: Daniel Soderberg, Stockholm (SE)

(73) Assignee: STFI, Skogsindustrins Tekniska Forskningsinstitut AB, Stockholm (SE)

( * ) Notice: Subject to any disclaimer, the term of this patent is extended or adjusted under 35 U.S.C. 154(b) by 169 days.

(21) Appl. No.: 12/666,499

(22) PCT Filed: Jun. 30, 2008

(86) PCT No.: PCT/SE2008/050806
§ 371 (c)(1),
(2), (4) Date: Dec. 23, 2009

(87) PCT Pub. No.: WO2009/008814
PCT Pub. Date: Jan. 15, 2009

(65) Prior Publication Data
US 2010/0181039 A1   Jul. 22, 2010

(30) Foreign Application Priority Data
Jul. 6, 2007 (SE) ...................................... 0701640

(51) Int. Cl.
*D21F 13/00* (2006.01)

(52) U.S. Cl. ........................................ 162/198; 162/263

(58) Field of Classification Search .................. 162/198, 162/263
See application file for complete search history.

(56) References Cited

U.S. PATENT DOCUMENTS

| | | |
|---|---|---|
| 5,113,454 A | 5/1992 | Marcantonio et al. |
| 5,393,378 A | 2/1995 | Yakabe et al. |
| 6,118,132 A | 9/2000 | Tullis |
| 6,222,174 B1 | 4/2001 | Tullis et al. |
| 2006/0096727 A1 | 5/2006 | Ferm et al. |
| 2006/0171725 A1 | 8/2006 | Ruthenberg et al. |

FOREIGN PATENT DOCUMENTS

| | | |
|---|---|---|
| EP | 0 329 889 A2 | 8/1989 |
| JP | 54130168 A | 10/1979 |
| JP | 4086562 A | 3/1992 |
| WO | WO 0153603 A1 | 7/2001 |

OTHER PUBLICATIONS

International Search Report, corresponding to PCT/SE2008/050806, mailed on Nov. 5, 2008.
Written Opinion, corresponding to PCT/SE2008/050806, mailed on Nov. 5, 2008.

*Primary Examiner* — Mark Halpern
(74) *Attorney, Agent, or Firm* — Renner, Otto, Boisselle & Sklar, LLP (57) ABSTRACT

Device for measuring the two-dimensional velocity of a moving paper web having opposed first and second surfaces, wherein comprising: at least one light source directed at said first surface and arranged to transmit light through said paper web; at least one image capturing device directed at said second surface, and arranged to receive said transmitted light and produce a two-dimensional image of a section of said paper web; a control unit, arranged to control said at least one light source and at least one image capturing device, and to receive two-dimensional images from said at least one image capturing device, and comprising computation means arranged to compute the velocity component of said paper web in the machine direction and/or the cross direction by calculating the cross correlation of two two-dimensional images.

18 Claims, 7 Drawing Sheets

DEVICE AND METHOD FOR MEASURING THE VELOCITY OF A MOVING PAPER WEB

This application is a 371 of PCT/SE2008/050806 filed on 30 Jun. 2008.

FIELD OF THE INVENTION

The present invention is related to the field of paper making, and in particular to a device and a method for measuring the two-dimensional velocity of a moving paper web.

BACKGROUND

In paper production, twin-wire forming and fourdrinier forming are two commonly used techniques. In twin-wire forming, the paper making machine comprises a headbox, a twin-wire nip, an inner and an outer moving wire, and a forming roll. The headbox is fitted with a lip for adjustment of the flow of pulp suspension. The pulp suspension exits the headbox as a jet and is directed into the nip. Thereafter, the suspension is contained between the inner and outer wires and is dewatered over the forming roll. In fourdrinier forming, the suspension exits the headbox as a jet and lands on a forming table comprising a single moving wire. Hybrid machines feature both a fourdrinier and a twin wire.

Throughout this application, the moving wire or wires containing the pulp suspension will be referred to as a moving paper web. The pulp suspension of the moving paper web exhibits relative movements within the web, the speed of which may vary and thus cause shifting thickness of the web. This means that the local velocity at a point in the web varies over the observed area. The expression "machine direction" refers to the direction parallel to the movement of the web, and "cross direction" refers to the direction perpendicular to the movement of the web.

It is known in the art to measure various properties of the moving paper web, such as formation characteristics (e.g. fiber flocs) or surface weight profile, or velocity averaged over the observed area. These properties can vary across the web, both in the cross direction and the machine direction. Variations in formation characteristics are a measure of the paper quality, whereas variations in velocity imply that the pulp is being stretched or fibers misaligned in a non-uniform manner, which will also affect the quality of the finished product.

Conventionally, such measurements are performed using one or more light sources directed at the paper web and one or more imaging devices (e.g. CCD cameras) positioned along the machine direction of the web, and capturing the light reflected off the web surface. The properties of interest can then be analyzed using image processing techniques.

The article "SOFA-STFI On-line Forming analyzer" (Söderberg L. D., 10$^{th}$ Control Systems Conference, Stockholm 2002) discloses a method for measuring properties in a moving paper web using transmitted rather than reflected light. The light source and the imaging device are positioned at opposite sides of the web, and the imaging device captures the light transmitted through the web. Measurements are performed in the machine direction only. A method for filtering out the wire pattern from the image is also disclosed.

Japanese patent application 2003-213585 discloses an apparatus for monitoring paper quality using transmitted light, where two or more cameras can be positioned crosswise over the web. This apparatus measures the average velocity of the observed area.

U.S. Pat. No. 6,118,132 discloses a system for measuring the velocity, displacement and strain on a moving surface or web of material. The system comprises two photo sensor arrays spaced a certain distance apart along the machine direction. Images from the two arrays are compared, and the displacement of a unique pattern on the web surface is measured and used to calculate the desired parameters. Reflected light is used. This apparatus measures the average velocity, displacement and strain in the observed area.

US 2006 0171 725 describes a two-dimensional detection system using an optical sensor to record images of the sheet, thereby measuring the velocity and direction of the sheet. This apparatus measures the average velocity, displacement and strain in the observed area.

Merely measuring the average velocity in accordance with the prior art cited above does not solve the problem of enabling local measurement and adjustment of the paper web in real time.

Therefore, a need still exists for more efficient and accurate methods for measuring the two-dimensional velocity of a moving paper web, for the sake of production efficiency and ensuring the quality of the end product.

SUMMARY OF THE INVENTION

An object of the present invention is to provide an improved method and device for measuring the two-dimensional velocity of a moving paper web, i.e. both in the machine direction and the cross-direction. The velocity of the moving paper web, i.e. the pulp suspension, is in the way of a flow. This flow may vary between relative positions in the paper web, whereby local measurements from different positions of the paper web need to be combined for correct adjustment of the lip.

According to one aspect of the invention, the measurement and subsequent adjustment of the headbox is carried out in real-time. The terms "real time" and "real-time adjustment" are intended to mean that input is fed to the headbox within an interval of 0-10 s from measurement, for example within less than 1 s. Said time period is dependent on the distance between the headbox and the measuring device, as well as the speed of the web. Consequently, the time period is usually determined by the length of the web.

Consequently, the lip of the headbox adjusts the speed of the web in two dimensions. In addition thereto, the local surface weight may also be measured and be made use of in the adjustments. The in-plane variations and variations in time measured in real-time using the current invention are extremely important as they underlie production economics. By use of the invention as described below, smoothness of the final product is ensured.

According to an aspect of the invention, a device for measuring the velocity of a moving paper web is provided. The device comprises at least one light source which is directed at a first surface of the paper web, and arranged to transmit light through the web. In addition, the device comprises at least one image capturing device directed at a second surface of the web, which is arranged to receive the transmitted light and produce a two-dimensional image of a section of the paper web. The device further comprises a control unit, arranged to receive two-dimensional images from the at least one image capturing device. The control unit comprises a computation means which is arranged to compute the velocity component of the paper web in the machine direction and/or the cross direction by calculating the cross correlation of two two-dimensional images.

The light source may emit continuous or flashing light. In the latter case, light may be emitted only when an image is captured. The light source may be integrated in the forming table, the headbox pr the drainage strip.

In one embodiment, the capturing device is traversing the paper web, whereby one capturing device may cover a substantial area of the web and supply data as to the relative movements of the measured areas.

According to another aspect of the invention, a paper making machine is provided, comprising at least one device for measuring the velocity of the moving web as described above.

According to an aspect of the invention, a paper making machine comprises a processing means arranged to receive a computed velocity component from said one or more means for measuring the velocity of a moving paper web and to use said computed velocity component to control the headbox, thereby performing real-time adjustment of the velocity of the paper web in the machine direction and/or the cross direction.

According to yet another aspect of the invention, a method for measuring two-dimensional the velocity of a moving paper web is provided. The method comprises the steps of:
a) transmitting light from at least one light source through the paper web;
b) capturing the transmitted light using at least one image capturing device;
c) producing a first two-dimensional image of a section of said paper web based on the captured transmitted light from step b);
d) once again transmitting light from at least one light source through said paper web;
e) once again capturing said transmitted light using at least one image capturing device;
f) producing a second two-dimensional image of a section of said paper web based on the captured transmitted light from step e);
g) computing the velocity component of the paper web in the machine direction and/or the cross direction by calculating the cross correlation of the first and second images.

According to an embodiment of the invention, the step of computing the velocity component (step g) above) involves extracting a first interrogation area from the first image, and a second interrogation area from the second image. The two images are captured sequentially, separated by a time distance dt, which must be small enough that at least a part of the web is reproduced in both images. The relative movement dx is then determined by performing cross correlation between the first and second interrogation areas. Finally, the velocity component of the paper web is computed as dx/dt.

Throughout this application, the term "image capturing device" is intended to embrace all kinds of devices capable of capturing an image or sequence of images, e.g. a camera using photographic film, a CCD camera, photo sensor array, video camera, etc. Both color and monochrome devices (e.g. color cameras and black-and-white cameras) are contemplated.

The term "light source" is intended to embrace any kind of device capable of emitting light, e.g. a conventional light bulb, a light-emitting diode (LED), fluorescent lamp, incandescent lamp, xenon arc lamp etc. Both pulsed and continuous light sources are contemplated.

As mentioned above, the term "moving paper web" refers primarily to a moving wire or wires containing a pulp suspension.

An advantage of the present invention is that by using transmitted light in combination with a cross correlation technique for measuring the velocity, the computation can be performed more rapidly and with higher accuracy compared to known solutions. This makes way for the above-mentioned real-time adjustment of the headbox.

A further advantage of the present invention is that it enables measurement of velocity in the cross direction, which makes it possible to detect e.g. non-uniform tension of the web more accurately than in known solutions, where cross-directional movement is not taken into account.

In one embodiment of the invention, measurement of the two-dimensional velocity of the moving paper web is accompanied by measurement of the local surface weight. According to this embodiment, the headbox receives feed-back data for adjustment of the lip thereof, whereby the two-dimensional speed of the web is used for adjusting the local surface weight. This in-all assessment of the web ensures the quality of the produced paper product.

The present invention is equally applicable to fourdrinier, twin wire, and hybrid paper making machines.

BRIEF DESCRIPTION OF THE DRAWINGS

The features and advantages of the present invention will become further apparent from the following detailed description and the accompanying drawings, of which.

DETAILED DESCRIPTION

Figure 1:
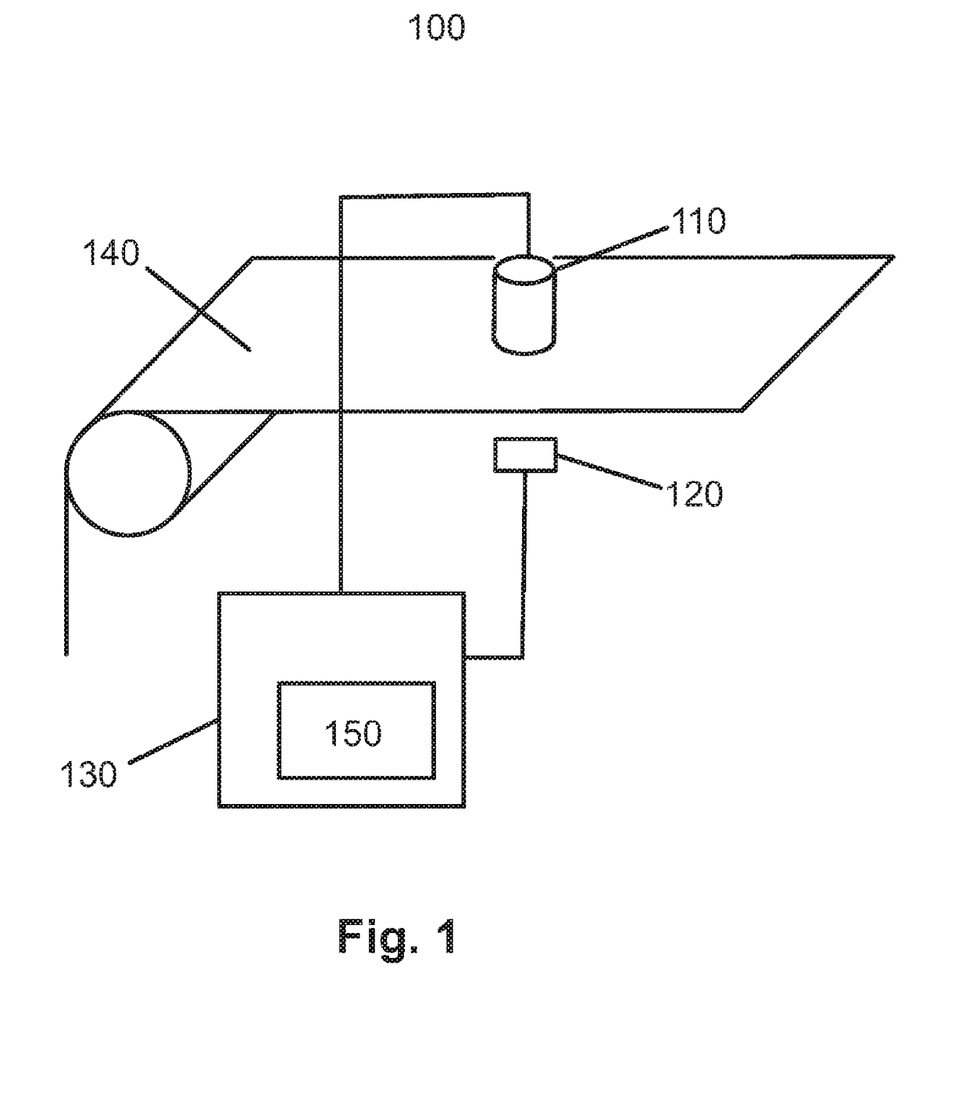
FIG. 1 illustrates a device according to an embodiment of the invention, using a single image capturing device.

Referring now to FIG. 1, a device 100 for measuring the velocity of a paper web 140 according to an embodiment of the invention is illustrated. The device 100 comprises a single image capturing device 110 (e.g. a CCD camera), a single light source 120 and a control unit 130. The control unit 130 comprises computation means 150. The image capturing device 110 is positioned a small distance above the web 140, and the single light source 120 is positioned a small distance below the web 140, opposing the image capturing device 110. In operation, the control unit 130 will send a signal to the image capturing device 110 instructing it to capture an image. Simultaneously, the control unit 130 sends a signal to the light source 120 instructing it to emit a light pulse. The light emitted from the light source 120 will be transmitted through the web 140 and captured by the image capturing device 110, resulting in a first image. After a brief time interval dt, the control unit 130 will once again send signals to the image capturing device 110 and the light source 120, resulting in a second image. The control unit 130 is arranged to select the time interval dt in such a way that at least some part of the web 140 will be captured in both images. Both images are received by the control unit 130, which instructs the computation means 150 to compute the velocity based on the two images. Finally, the computation means 150 performs the computation using cross correlation between the two images. The cross correlation computation will be described in more detail in connection with FIG. 6 below.

Alternatively, the light source 120 may be continuous (i.e. constantly transmitting light through the web 140) in which case the signal from the control unit 130 to the light source 120 is not necessary.

According to one embodiment of the invention, time-resolved velocity measurements are performed. In other words, the image capturing device 110 is instructed by the control unit 130 to continuously capture images. The computation means 150 will compute the velocity by cross correlation between each pair of consecutive images.

Figure 2:
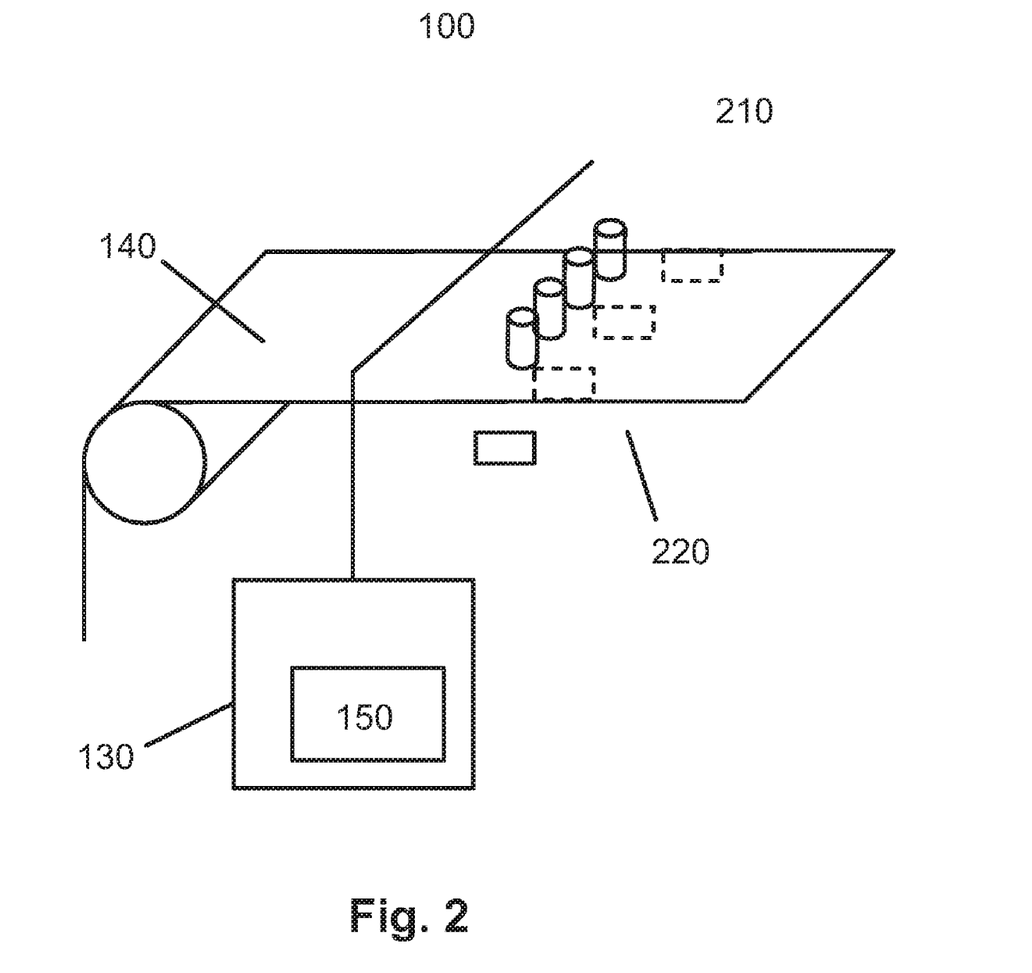
FIG. 2 illustrates a device according to a second embodiment of the invention, where several image capturing devices are positioned along the cross direction.

Now is referred to FIG. 2, which illustrates a device 200 for measuring the velocity of a paper web 140 according to another embodiment of the invention. This device uses four image capturing devices 210, positioned along the cross direction of the web 140, and four light sources 220 also positioned along the cross direction of the web 140, opposing the image capturing devices 210. In this configuration, the image capturing devices 210 will advantageously be positioned so that they cover the entire width of the web 140, thereby providing more reliable measurements in the cross direction.

Although FIG. 2 shows a setup with four image capturing devices and four light sources, any number of such devices may be used. In particular, the number of image capturing devices could be greater or less than the number of light sources, as long as the light source or light sources are arranged to provide sufficient illumination.

Obviously, time-resolved velocity measurements can also be performed in this configuration, in the same way as described in connection with FIG. 1 above.

Figure 3:
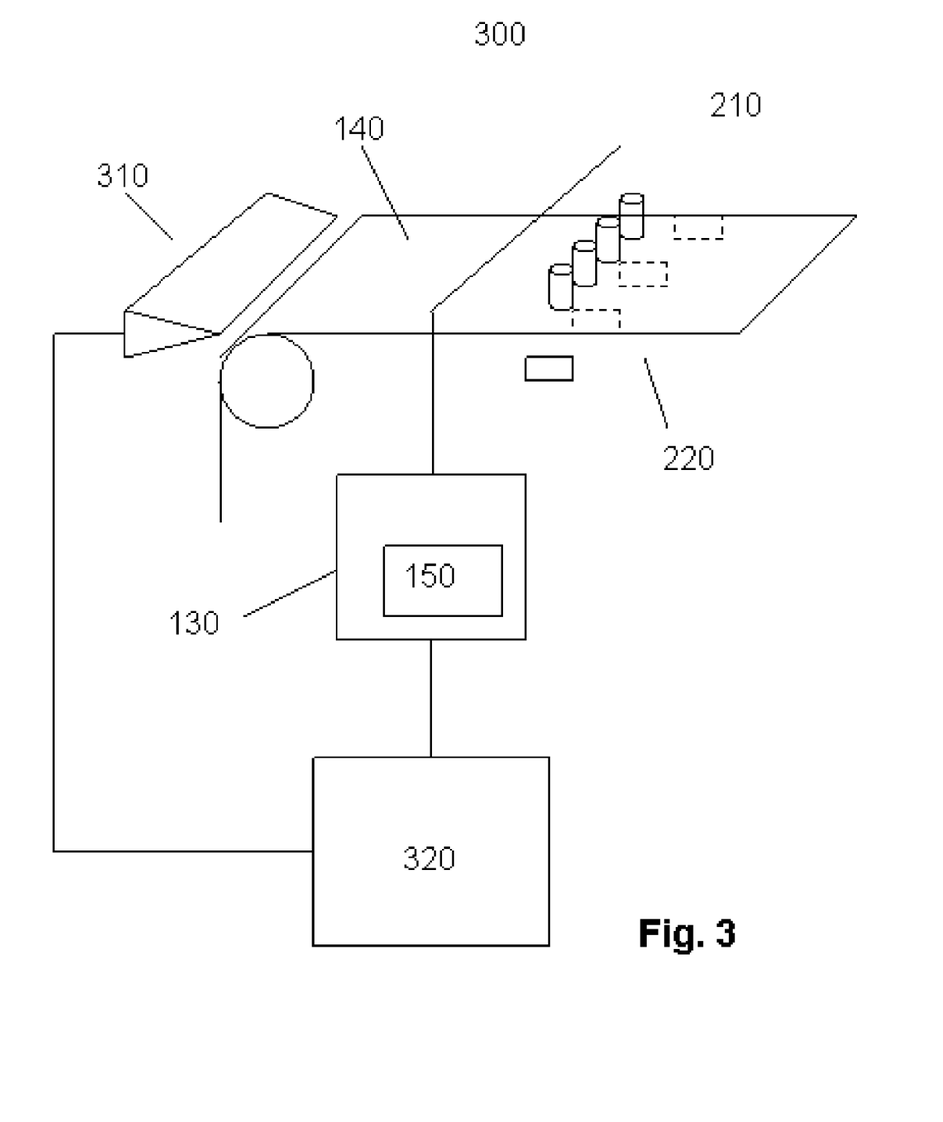
FIG. 3 illustrates a paper making machine according to an aspect of the invention.

FIG. 3 illustrates a paper making machine 300 according to an aspect of the invention, comprising a device for measuring velocity as shown in FIG. 2. The paper making machine 300 comprises a headbox 310, from which the pulp will exit, and processing means 320, which is used to control various parameters and settings of the paper making machine 300. In operation, the control unit 130 sends information to processing means 320 regarding the computed velocity in the machine and/or cross direction. Processing means 320 uses this information to control the headbox 310. In particular, variations in the slice opening in the cross direction and/or the dilution can be adjusted by processing means 320.

Figure 4:
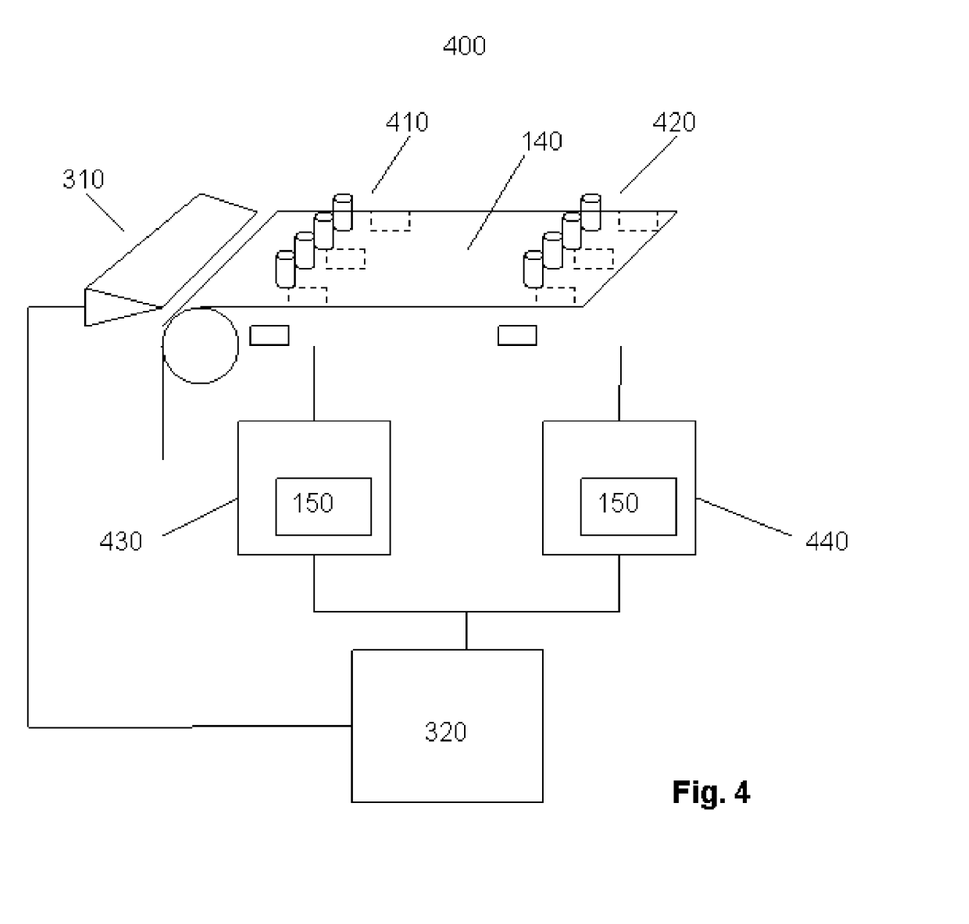
FIG. 4 illustrates a paper making machine according to an embodiment of the invention, where several devices for measuring velocity are positioned in different locations.

FIG. 4 illustrates a paper making machine 400 according to an embodiment of the invention, comprising two devices for measuring velocity positioned at different locations along the machine direction. The first device comprises image capturing devices and light sources 410, and control unit 430. The second device comprises image capturing devices and light sources 420, and control unit 440. Control units 430 and 440 are both connected to processing unit 320. As an alternative, the capturing device and light source may be adjusted for transversing the paper web. In this instance, only one device is needed, although several transversing devices may also be used.

Obviously, more than two devices for measuring velocity could be used, and the devices can be positioned at various locations in the paper making machine 400. In one preferred embodiment, a device for measuring velocity is integrated in an element of the forming table of the paper making machine 400. For instance, the device could be integrated in the suction slot. In one embodiment, the capturing device(s) and/or light source(s) are located in the headbox. In another embodiment, the light source(s) are integrated in the drainage strip below the paper web, whereby the drainage strip is made out of a transparent and advantageously easily cleaned material such as plexiglass.

Advantageously, the device or devices are placed in a position somewhere between the headbox and the drying section of the paper making machine 400.

Figure 5:
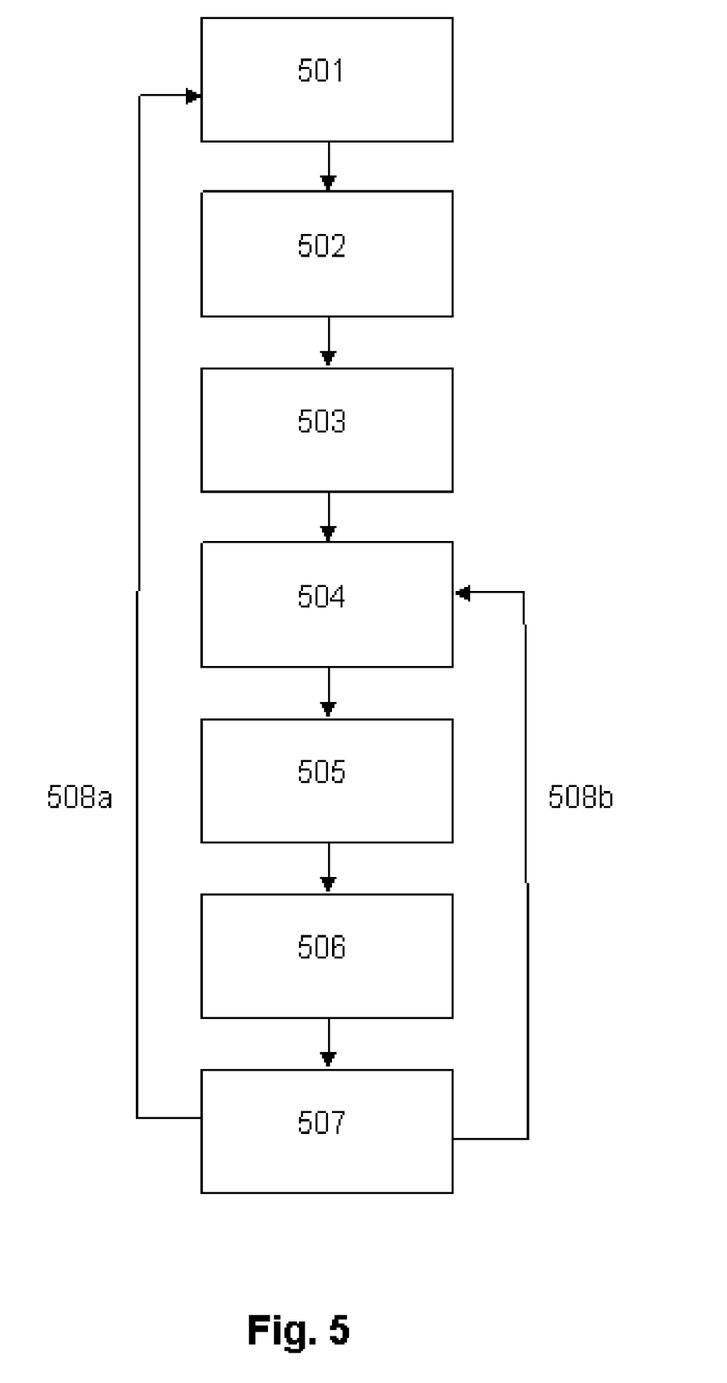
FIG. 5 is a flow chart illustrating a method for measuring the velocity of a moving web according to an aspect of the invention.

FIG. 5 is a flow chart illustrating a method for measuring the velocity of a moving web according to an aspect of the invention. The method starts with step 501, which involves transmitting light from at least one light source through the paper web. In step 502, the transmitted light is captured using at least one image capturing device. In step 503, a first two-dimensional image of a section of the paper web is produced, based on the captured transmitted light from step 502. A second two-dimensional image is then produced in steps 504-506. In step 504, light is again transmitted from at least one light source through the paper web (as in step 501). In step 505, the transmitted light is captured using at least one image capturing device (corresponding to step 502). In step 506, a second two-dimensional image of a section of the paper web is produced, based on the captured transmitted light from step 505. Finally, in step 505 the velocity component of the paper web in the machine direction and/or the cross direction is computed by calculating the cross correlation of said first and second images.

The method may be repeated any number of times (for instance, once a minute, once every hour, or at random time intervals), as indicated by step 508*a*.

According to the embodiment of the invention where time-resolved measurements are performed (described in connection with FIG. 1 above), the method would instead continue with step 508*b*. In step 508*b*, the second two-dimensional image obtained in step 506 is made into the new first two-dimensional image. Steps 504-506 are then performed again, resulting in a new second two-dimensional image, and a new computation is performed in step 507 using the new first and second images. In other words, the computation in step 507 is always performed using the two latest captured consecutive images.

Figure 6:
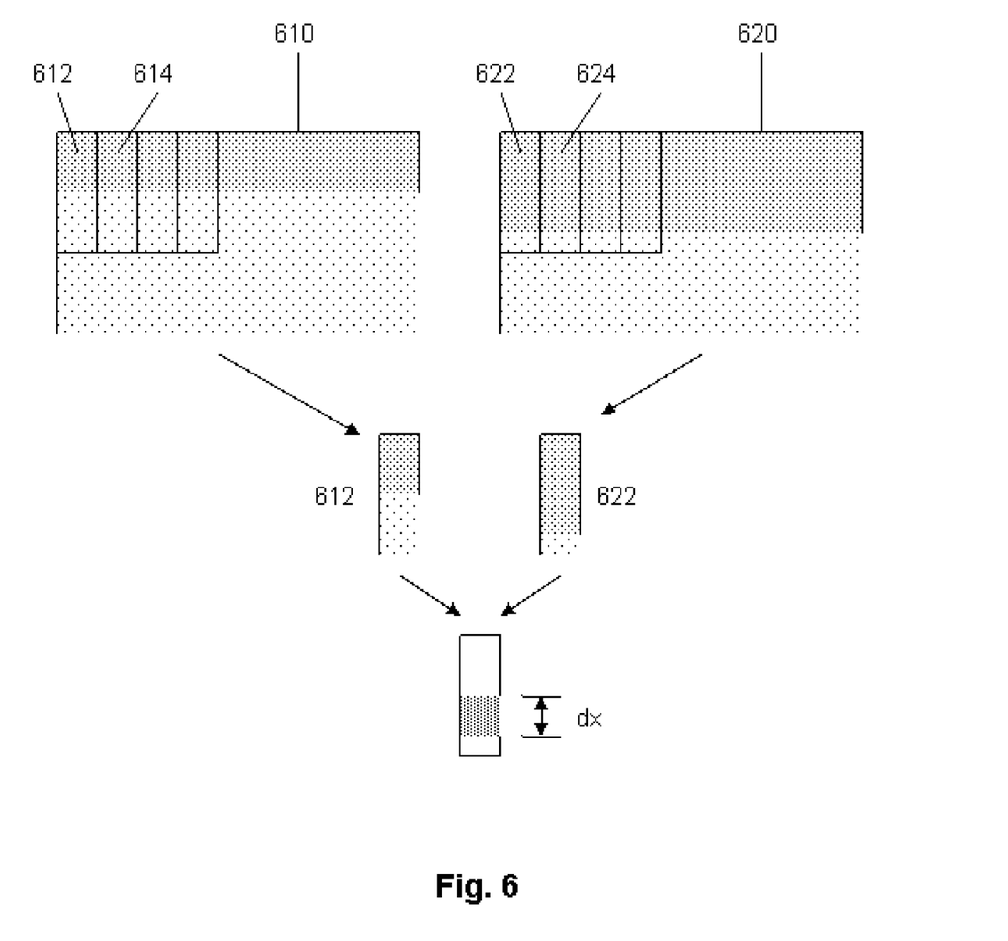
FIG. 6 illustrates the cross correlation computation according to an embodiment of the invention.

FIG. 6 illustrates the cross correlation computation according to an embodiment of the invention. Two images 610 and 620 have been captured, separated by a time distance dt. In image 610 an abrupt change in texture can be seen. The same texture change is also captured in image 620, but is slightly offset because of the time difference between the images. The cross correlation computation begins by extracting smaller parts, called interrogation areas, from images 610 and 620. In FIG. 6, four interrogation areas 612, 614, 622 and 624 are indicated. Cross correlation is then performed pairwise on the extracted interrogation areas. FIG. 6 shows cross correlation between interrogation areas 612 and 622. By detecting patterns occurring in both areas 612 and 622 (i.e. the texture changes in this example), the movement dx can be determined. The velocity is then computed as dx/dt.

Figure 7:
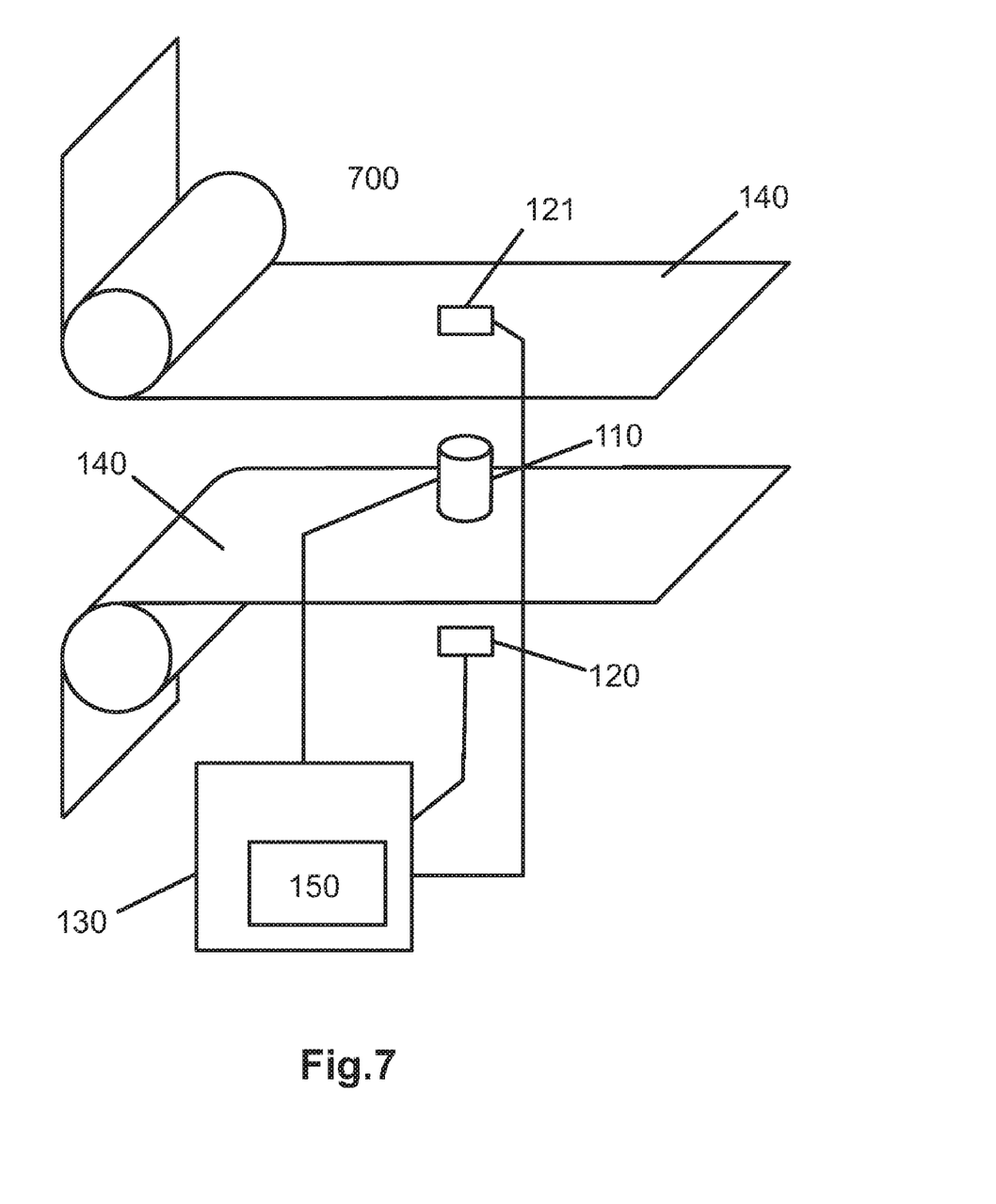
FIG. 7 illustrates the placement of the device on one paper web (A) and between two paper webs (B), respectively.

FIG. 7 shows an aspect of the invention, wherein the paper machine 700 comprises two paper webs 140 with the image capturing device 110 located in between them and the respective light sources 120, 121 located opposite one another, above and below the paper webs, respectively. The time-resolved velocity measurements may in this configuration be performed in the same manner as described in connection with FIG. 1 above.

The method described can be used in both the machine direction and the cross direction.

Although the present invention has been described as related to paper making, the skilled person will realize that the same device and method is equally applicable in any situation where it is desirable to measure the speed of a moving web or sheet of material.

The foregoing detailed description is intended to illustrate and provide easier understanding of the invention, and should not be construed as limitations. Alternative embodiments will become apparent to those skilled in the art without departing from the spirit and scope of the present invention.

The invention claimed is:

1. A device for measuring the two-dimensional velocity of a moving paper web having opposed first and second surfaces, wherein comprising:
   a) at least one light source directed at said first surface and arranged to transmit light through said paper web;
   b) at least one image capturing device directed at said second surface, and arranged to receive said transmitted light and produce a two-dimensional image of a section of said paper web;
   c) a control unit, arranged to control said at least one light source and at least one image capturing device, and to receive two-dimensional images from said at least one image capturing device, and comprising computation means arranged to compute the velocity component of said paper web in the machine direction and/or the cross direction by calculating the cross correlation of two two-dimensional images.

2. The device according to claim 1, further comprising measurement of the local surface weight.

3. The device according to claim 1 comprising at least two image capturing devices positioned in series along the cross direction of said paper web.

4. The device according to claim 1, comprising at least one, traversing image capturing device.

5. The device according to claim 1, wherein said image capturing device(s) is/are arranged or arrangeable to produce images covering, in total, the entire cross-directional width of the paper web.

6. The device according to claim 1, wherein said control unit is arranged to bring each one of said at least one image capturing devices to capture a first and second image in rapid succession, so that at least a part of said moving web is reproduced in both the first and second image, and wherein said computation means is arranged to calculate the cross correlation between said first and second image.

7. The device according to claim 1, wherein each one of said at least one light sources is arranged to emit two pulses of light in two separate parts of the spectrum, and each one of said at least one image capturing devices is adapted to capture two separate parts of the spectrum from said transmitted light and produce two corresponding images, and wherein said computation means is arranged to calculate the cross correlation between said two corresponding images.

8. The device according to claim 1, wherein said control unit is arranged to instruct said one or more image capturing devices to continuously capture images.

9. The device according to claim 1, wherein said control unit are further arranged to receive said computed velocity component from the computation means and to use said computed velocity component to send feedback signals to a paper making machine, said feedback signals being adapted to cause real-time adjustment of the velocity of the paper web in the machine direction and/or the cross direction.

10. A paper making machine characterized in comprising a head box and processing means, wherein comprising at least one device for measuring the velocity of a moving paper web according to claim 1.

11. The paper making machine according to claim 10, wherein at least one of said devices is integrated in the forming table, the head box or the drainage strip.

12. The paper making machine according to claim 10, wherein said processing means is arranged to receive a computed velocity component from said one or more devices for measuring the velocity of a moving paper web, and to use said computed velocity component to control said head box, thereby performing real-time adjustment of the velocity of the paper web in the machine direction and/or the cross direction.

13. A method for measuring the velocity of a moving paper web, comprising the following steps:
   d) transmitting light from at least one light source through said paper web;
   e) capturing said transmitted light using at least one image capturing device;
   f) producing a first two-dimensional image of a section of said paper web based on the captured transmitted light from step b);
   g) once again transmitting light from at least one light source through said paper web;
   h) once again capturing said transmitted light using at least one image capturing device;
   i) producing a second two-dimensional image of a section of said paper web based on the captured transmitted light from step e);
   j) computing the velocity component of said paper web in the machine direction and/or the cross direction by calculating the cross correlation of said first and second images.

14. The method according to claim 13, wherein steps b) and e) are separated by a time distance dt, dt being small enough that at least part of said moving paper web is reproduced in both the first and second image.

15. The method according to claim 13, wherein steps a)-g) are repeated any number of times.

16. The method according to claim 13, comprising the further steps of:
   h) making the second two-dimensional image, obtained in step f), into the new first two-dimensional image;
   i) repeating steps d)-h) any number of times.

17. The method according to claim 13, wherein step g) involves the sub-steps of:
   k) extracting a first interrogation area from said first image;
   l) extracting a second interrogation area from said second image;
   m) determining the relative movement dx by performing cross correlation between said first and second interrogation areas;
   n) computing the velocity component of said paper web in the machine direction and/or the cross direction as dx/dt.

18. The method according to claim 13, comprising the additional step of using said calculated velocity component to perform real-time adjustment of the velocity of the paper web in the machine direction and/or the cross direction.

* * * * *